United States Patent
Board et al.

(10) Patent No.: US 12,466,166 B2
(45) Date of Patent: *Nov. 11, 2025

(54) LIGHT WEIGHT HURRICANE WINDOW AND LAMINATE WITH UNTEMPERED SHEET

(71) Applicant: CORNING INCORPORATED, Corning, NY (US)

(72) Inventors: Anthony Robert Board, Breesport, NY (US); James Gregory Couillard, Ithaca, NY (US); Michael Aaron McDonald, Painted Post, NY (US); Dean Michael Ruark, Sarasota, FL (US); Kenneth John Vander Bent, Jr., Bradenton, FL (US)

(73) Assignee: CORNING INCORPORATED, Corning, NY (US)

(*) Notice: Subject to any disclaimer, the term of this patent is extended or adjusted under 35 U.S.C. 154(b) by 1093 days.

This patent is subject to a terminal disclaimer.

(21) Appl. No.: 17/296,383

(22) PCT Filed: Nov. 24, 2019

(86) PCT No.: PCT/US2019/062893
§ 371 (c)(1),
(2) Date: May 24, 2021

(87) PCT Pub. No.: WO2020/112574
PCT Pub. Date: Jun. 4, 2020

(65) Prior Publication Data
US 2022/0024184 A1     Jan. 27, 2022

Related U.S. Application Data

(60) Provisional application No. 62/772,727, filed on Nov. 29, 2018.

(51) Int. Cl.
*C03C 3/04* (2006.01)
*B32B 7/027* (2019.01)
*B32B 17/10* (2006.01)

(52) U.S. Cl.
CPC ........ *B32B 17/10091* (2013.01); *B32B 7/027* (2019.01); *B32B 17/10045* (2013.01); *B32B 17/10119* (2013.01); *C03C 3/04* (2013.01); *B32B 2307/732* (2013.01)

(58) Field of Classification Search
None
See application file for complete search history.

(56) References Cited

U.S. PATENT DOCUMENTS

| | | |
|---|---|---|
| 4,985,099 A | 1/1991 | Mertens et al. |
| 6,445,864 B2 | 9/2002 | Jiang et al. |
| 6,466,721 B1 | 10/2002 | Tsukitani et al. |
| 8,855,316 B2 | 10/2014 | Wiseman et al. |
| 9,313,180 B1 | 4/2016 | Gray et al. |
| 11,218,226 B2 | 1/2022 | Li et al. |
| 2003/0044579 A1* | 3/2003 | Bolton .............. B32B 17/10935 428/167 |
| 2005/0008797 A1 | 1/2005 | Bayha et al. |
| 2005/0111803 A1 | 5/2005 | Bickham |
| 2005/0185906 A1 | 8/2005 | Bickham et al. |
| 2006/0257071 A1 | 11/2006 | Bise et al. |
| 2007/0116418 A1 | 5/2007 | Mishra |
| 2008/0190070 A1* | 8/2008 | Duncan .................... E06B 5/10 52/786.11 |
| 2010/0226659 A1 | 9/2010 | Nishioka et al. |
| 2011/0268401 A1 | 11/2011 | Wei |
| 2012/0031022 A1 | 2/2012 | Morgan et al. |
| 2013/0163759 A1 | 6/2013 | Harrison et al. |
| 2014/0355998 A1 | 12/2014 | Tanzilli et al. |
| 2015/0251377 A1* | 9/2015 | Cleary .............. B32B 17/10036 428/172 |
| 2015/0316713 A1 | 11/2015 | Yamamoto et al. |
| 2015/0372768 A1 | 12/2015 | Dynes et al. |
| 2017/0119176 A1 | 5/2017 | Christiansen et al. |
| 2018/0198608 A1 | 7/2018 | Nordholt et al. |
| 2021/0399810 A1 | 12/2021 | Li et al. |

FOREIGN PATENT DOCUMENTS

| | | |
|---|---|---|
| CN | 101111977 A | 1/2008 |
| CN | 101118301 A | 2/2008 |
| EP | 0418123 A1 | 3/1991 |
| EP | 1257076 A1 | 11/2002 |
| FR | 2632950 A1 | 12/1989 |
| WO | 2015/050623 A2 | 4/2015 |
| WO | 2016/204847 A2 | 12/2016 |

(Continued)

OTHER PUBLICATIONS

Takesue et al., "Quantum key distribution over a 40-dB channel loss using superconducting single-photon detectors", Jun. 1, 2007, 15 pages.

Chinese Patent Application No. 201880028684.2, Office Action dated Feb. 25, 2022, 06 pages of English Translation, Chinese Patent Office.

Guang Wu, et al, "Single-photon interference and router-control in an optic fiber Sagnac interferometer", Acta Physica Sinica, vol. 53(3), 2004, pp. 698-702.

Alberto Boaron et al: "Secure quantum key distribution over 421 km of optical fiber", arxiv.org, Cornell University Library, 201 Olin Library Cornell University Ithaca, NY 14853 Jul. 9, 2018 (Jul. 9, 2018).

Hasegawa et al., "Experimental realization of quantum cryptosystem over 87 km", Quantum Electronics and Laser Science, Jun. 1-6, 2003, pp. 1-2.

(Continued)

*Primary Examiner* — Sheeba Ahmed

(57) ABSTRACT

A hurricane-resistant laminated pane comprises a first sheet of thermally strengthened glass having a thickness in the range of from 2 to 24 mm, a second sheet of untempered glass having a thickness in the range of from 0.3 to 1 mm, and a polymer interlayer adhered between the first sheet and the second sheet. A process for making such a pane and a window comprising such a pane are also disclosed.

11 Claims, 1 Drawing Sheet

(56) References Cited

FOREIGN PATENT DOCUMENTS

WO 2018/160781 A1 9/2018
WO 2018/213213 A1 11/2018

OTHER PUBLICATIONS

Hua-Lei Yin et al: "Measurement device independent quantum key distribution over 404 km optical fibre", arxiv.org, Cornell University Library, 201 Olin Library Cornell University Ithaca, NY 14853 Jun. 22, 2016 (Jun. 22, 2016).

International Search Report and Written Opinion of the International Searching Authority; PCT/US2019/062893; dated Feb. 13, 2020; 8 pages; European Patent Office.

Mora et al; "Dispersion Supported BB84 Quantum Key Distribution Using Phase Modulated Light"; IEEE Photonics Journal, vol. 3, No. 3, Jun. 2011; pp. 433-440.

Nishioka et al., "Single-Photon Interference Experiment Over 80 km With a Pulse-Driven Heralded Single-Photon Source", IEEE Photonics Technology Letters, vol. 20, No. 5, Mar. 1, 2008, pp. 354-356.

Ozhegov R et al: "Quantum key distribution over 300", Proceedings of SPIE/ IS & T vol. 9440, Dec. 18, 2014 (Dec. 18, 2014), pp. 94401F-94401F.

Sangouard et al; "Quantum Repeaters Based on Atomic Ensembles and Linear Optics," Group of Applied Physics, vol. 83, 2009, pp. 1-52.

Shu et al., "Effects of loss and dispersion on fiber-based quantum key distribution", Proc. of SPIE., vol. 7136, Nov. 11, 2008, pp. 71360B-1-71360B-8.

Stucki D et al., "High rate, long-distance quantum key dirstibution over 250 km of ultra low loss fibres", New Journal of Physics, Institute of Physics Publishing, Bristol, GB, vol. 11, No. 7, Jul. 1, 2009 (Jul. 1, 2009), p. 75003.

Takesue et al., "Quantum key distribution over a 40-dB channel loss using superconducting single-photon detectors", Jun. 1, 2007, pp. 343-348.

Mora et al., "Dispersion Supported BB84 Quantum Key Distribution Using Phase Modulated Light" In IEEE Photonics Journal, vol. 3, No. 3, Jun. 2011, 9 Pages.

* cited by examiner

LIGHT WEIGHT HURRICANE WINDOW AND LAMINATE WITH UNTEMPERED SHEET

CROSS-REFERENCE TO RELATED APPLICATIONS

This application claims the benefit of priority under 35 U.S.C. § 371 of International Application No. PCT/US2019/062893, filed on Nov. 24, 2019, which claims the benefit of priority under 35 U.S.C. § 119 of U.S. Provisional Application No. 62/772,727, filed Nov. 29, 2018, the content of each of which is incorporated herein by reference in its entirety.

FIELD OF THE DISCLOSURE

The disclosure relates generally to hurricane resistant laminated panes having two sheets of glass and a polymer interlayer, where one sheet of glass is untempered meaning that it is not thermally or chemically strengthened but is essentially in strength condition "as produced", and to windows employing one or more such laminated panes for combined impact and pressure cycling resistance such as in hurricane windows, or for other purposes such as for increased intrusion resistance.

BACKGROUND

So-called hurricane windows typically employ reinforced frame and spacer components as well as an inner laminated pane comprising two sheets of glass and a polymer interlayer having a high elastic modulus (or a high elastic modulus under sufficiently fast deformation). FIG. 3 (Prior Art) shows an example of such a window 200, intended as a hurricane window (or an IGU 200 for such a window).

As seen in FIG. 3, the window 200 includes an outer pane 10 and an inner laminated pane 12. The outer pane 10 is typically in the form of a single sheet 50 of glass, surfaces of the sheet 50 correspond to an outer or first surface S1 and a second surface S2 (interior) of the window 200. The laminated pane 12 comprises a first sheet 20 of glass and a second sheet 70 of glass with a polymer interlayer 40 adhered between the first sheet 20 and the second sheet 70. The polymer interlayer has a high elastic modulus (or a high elastic modulus under sufficiently fast deformation), such as, for example, within the range of 300 to 1000 MPa or 400 to 600 MPa when measured at an elongation rate of 10 mm per minute at 30° C. An inner-facing surface of first sheet 20 and an outer facing surface of second sheet 70 correspond to a third surface S3 (interior) and an inner or fourth surface S4 (dwelling-facing) of the window 200. Reinforced spacers 60 and a reinforced frame (not shown) are also employed.

During a hurricane, if a wind-driven projectile strikes surface S1 with sufficient force, then sheet 50, first sheet 20, and second sheet 70 can all be broken by the impact, but if the window 200 operates as intended, the polymer interlayer 40 remains intact and remains sealed within the window frame, preventing wind and wind-borne water from passing through the window 200 and entering the dwelling even after sheet 50, first sheet 20, and second sheet 70 are broken. To enable the polymer interlayer 40 to survive such an impact, the first sheet 20 and the second sheet 70 of the laminated pane 12 are heat strengthened, meaning they are thermally tempered to produce a surface compression generally in the range of from about 24 to 52 MPa (3,500 to 7,500 psi). (The sheet 50 is also generally heat strengthened.)

If the first sheet 20 and the second sheet 70 are not thermally strengthened, they tend to break upon impact into large, sharp-edged fragments that can tear, puncture or otherwise damage the interlayer 40, causing it to fail to maintain the desired seal. It would be desirable to provide a hurricane resistant window having lower manufacturing process costs, such as by avoiding unneeded thermal strengthening, while still preserving or even improving other window properties.

SUMMARY

According to aspects of the disclosure, a light weight hurricane-resistant laminated pane is provided, comprising a first sheet of thermally strengthened glass having a thickness in the range of from 2 to 24 mm, a second sheet of untempered glass having a thickness in the range of from 0.3 to 1 mm, and a polymer interlayer between the first sheet and the second sheet and adhered to the first sheet and the second sheet. The use of a thin second sheet allows the second sheet to be used in untempered form, saving both weight (by thinness) and processing cost (by lack of need for tempering).

According to aspects, the first sheet is a sheet of a soda lime silicate glass.

According to aspects, the second sheet is a sheet of a soda lime silicate glass.

According to other aspects of the disclosure, the second sheet is a sheet of a boro-aluminosilicate glass, or a sheet of an alkaline earth boro-aluminosilicate glass or an alkali-free boro-aluminosilicate glass.

According to aspects, the second sheet has a thickness in the range of from 0.85 to 0.4 mm, or of from 0.8 to 0.45 mm.

Also disclosed as another aspect is a window comprising a laminated pane according to any of the above aspects.

According to aspects of the present disclosure, a process for forming a hurricane resistant laminated pane comprises thermally strengthening a first sheet of glass having a thickness in the range of from 2 to 24 mm and, using a polymer interlayer, laminating the first sheet of glass to a second sheet of untempered glass having a thickness in the range of from 0.3 to 1 mm.

According to aspects, a hurricane resistant window comprises an outer pane having a thickness in the range of from 2 to 24 mm, an inner laminated pane comprising a first sheet of thermally strengthened glass having a thickness in the range of from 2 to 24 mm and a second sheet of untempered glass having a thickness in the range of from 0.3 to 1 mm and a polymer interlayer between the first sheet and the second sheet and adhered to the first sheet and the second sheet.

According to aspects, the first sheet of the laminated pane faces of the hurricane resistant window faces the outer pane.

According to aspects, the second sheet of the laminated pane faces of the hurricane resistant window faces the outer pane.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and, together with the description, serve to explain the principles and operations of the disclosure.

BRIEF DESCRIPTION OF THE DRAWINGS

The following detailed description can be further understood when read in conjunction with the following drawings in which.

DETAILED DESCRIPTION

Various aspects of the disclosure will now be discussed with reference to FIGS. 1-2, which illustrate aspects of laminated panes, and windows employing such panes and their components, features, or properties. The following general description is intended to provide an overview of the claimed devices, and various aspects will be more specifically discussed throughout the disclosure with reference to the non-limiting depicted aspects, these aspects generally being interchangeable with one another within the context of the disclosure.

Figure 1:
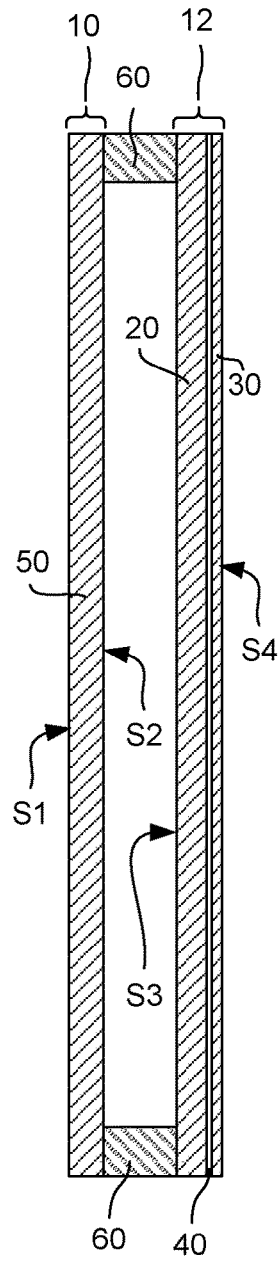
FIG. 1 is a cross-sectional view of a window or IGU according to aspects of the present disclosure.
Figure 2:
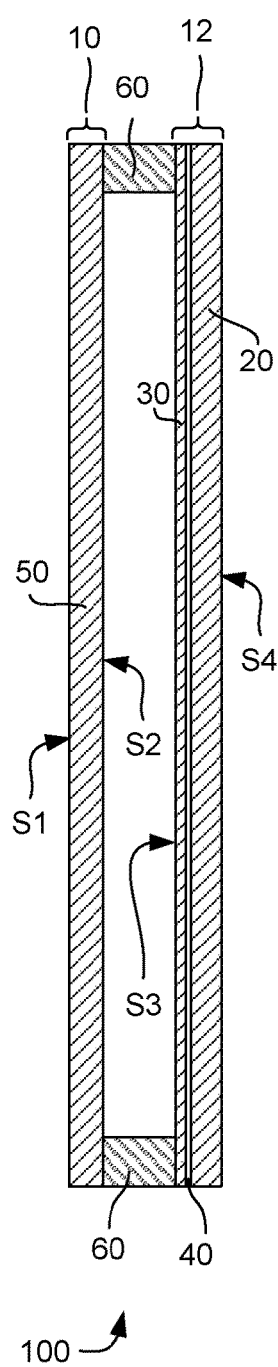
FIG. 2 is another cross-sectional view of a window or IGU according to aspects of the present disclosure.
Figure 3:
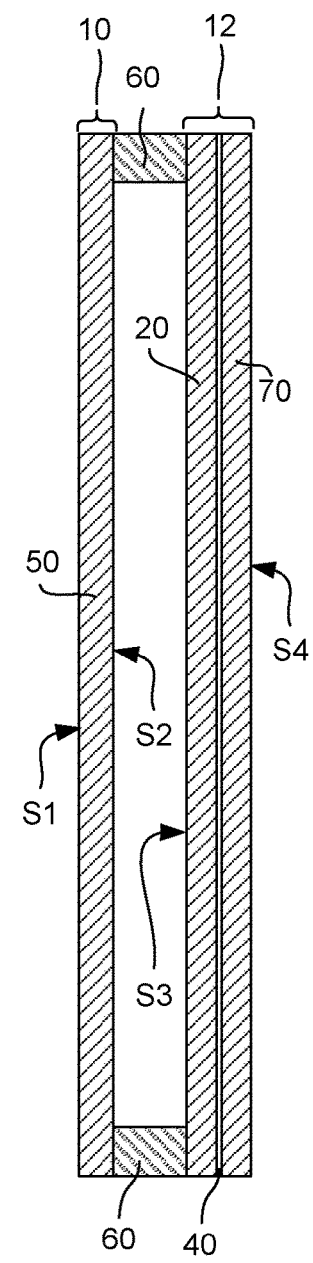
FIG. 3 (Prior Art) is a cross-sectional elevational representation of a prior art hurricane-resistant window.

With reference to FIG. 1, disclosed herein is a light weight hurricane-resistant laminated pane 12 and a window 100 employing such a pane. The pane 12 comprises a first sheet 20 of thermally strengthened glass having a thickness in the range of from 2 to 24 mm, a second sheet 30 of untempered glass having a thickness in the range of from 0.3 to 1 mm, and a polymer interlayer 40 between the first sheet 20 and the second sheet 30 and adhered to the first sheet 20 and the second sheet 30. Based on testing comprised of impact followed by pressure cycling, the use of a thin second sheet 20 allows the second sheet to be successfully used in untempered form, saving both weight (by thinness) and processing cost (by lack of need for tempering) while still providing hurricane resistant performance.

The first sheet 20 can be a sheet of a soda lime silicate glass.

The second sheet 30 can also be a sheet of a soda lime silicate glass. Alternatively, the second sheet 30 can be a sheet of a boro-aluminosilicate glass, or a sheet of an alkaline earth boro-aluminosilicate glass or an alkali-free boro-aluminosilicate glass. The thickness of the second sheet can be in the range of from 0.85 to 0.4 mm, or of from 0.8 to 0.45 mm.

An improved process of forming a hurricane resistant window comprises thermally strengthening a first sheet of glass 20 having a thickness in the range of from 2 to 24 mm and, using a polymer interlayer 40, laminating the first sheet of glass 20 to a second sheet of untempered glass 30 having a thickness in the range of from 0.3 to 1 mm.

As shown in FIG. 1, the first sheet 20 of the laminated pane 40 can face an outer pane 10 of the hurricane resistant window 100. As shown in FIG. 2, the second sheet 30 of the laminated pane 40 can face the outer pane 10.

It will be appreciated that the various disclosed embodiments can involve particular features, elements or steps that are described in connection with that particular embodiment. It will also be appreciated that a particular feature, element or step, although described in relation to one particular embodiment, can be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having one such "component" or two or more such "components" unless the context clearly indicates otherwise. Similarly, a "plurality" or an "array" is intended to denote two or more, such that an "array of components" or a "plurality of components" denotes two or more such components.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 100 nm" and "a dimension less than about 100 nm" both include embodiments of "a dimension less than about 100 nm" as well as "a dimension less than 100 nm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments can be disclosed using the transitional phrase "comprising," it is to be understood that alternative embodiments, including those that can be described using the transitional phrases "consisting" or "consisting essentially of," are implied. Thus, for example, implied alternative embodiments to a device comprising A+B+C include embodiments where a device consists of A+B+C, and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure can occur to persons skilled in the art, the disclosure should be construed to include everything within the scope of the appended claims and their equivalents.

What is claimed is:

1. A hurricane resistant window comprising:
an outer pane having a thickness in the range of from 2 to 24 mm;

an inner laminated pane comprising
    a first sheet of thermally strengthened glass having a thickness in the range of from 2.5 to 24 mm and
    a second sheet of untempered glass having a thickness in the range of from 0.3 to 1 mm and
    a polymer interlayer that extends between the first sheet and the second sheet and is adhered to the first sheet and the second sheet.

2. The hurricane resistant window of claim 1, wherein the first sheet is a sheet of a soda lime silicate glass.

3. The hurricane resistant window of claim 1, wherein the second sheet is a sheet of a soda lime silicate glass.

4. The hurricane resistant window of claim 1, wherein the second sheet is a sheet of a boro-aluminosilicate glass.

5. The hurricane resistant window of claim 1, wherein the second sheet is a sheet of an alkaline earth boro-aluminosilicate glass or an alkali-free boro-aluminosilicate glass.

6. The hurricane resistant window of claim 1, wherein the second sheet has a thickness in the range from 0.4 to 0.85 mm.

7. The hurricane resistant window of claim 1, wherein the second sheet has a thickness in the range from 0.45 to 0.8 mm.

8. The hurricane resistant window of claim 1 in which the first sheet of the laminated pane faces the outer pane.

9. The hurricane resistant window of claim 1 in which the second sheet of the laminated pane faces the outer pane.

10. The hurricane resistant window of claim 1, wherein the first sheet has a thickness in the range from 3 to 24 mm.

11. The hurricane resistant window of claim 1, wherein the first sheet has a thickness in the range from 3.5 to 24 mm.

\* \* \* \* \*